Jan. 22, 1929.
T. H. POYNTON
1,699,918
BODY FOR MOTOR VEHICLES
Filed Dec. 24, 1927
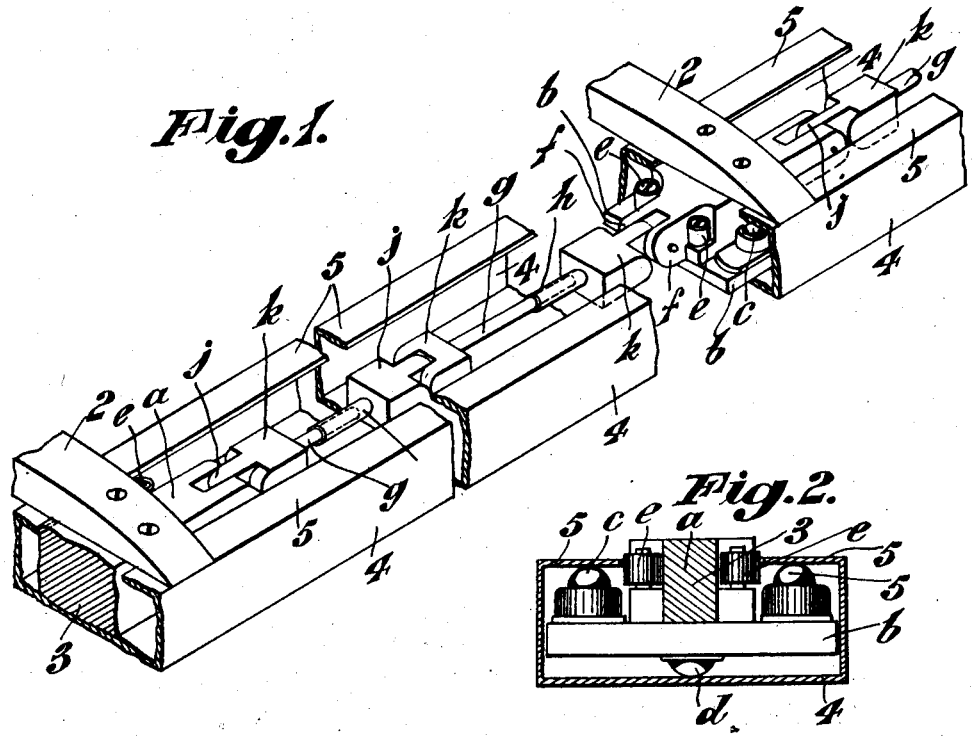
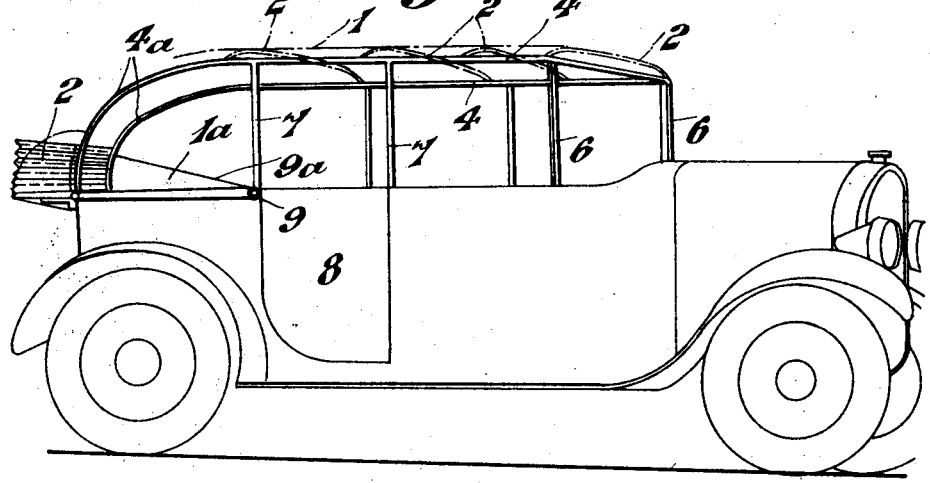
INVENTOR:—
T.H. POYNTON.
per G. Hughes.
ATTORNEY.

Patented Jan. 22, 1929.

1,699,918

UNITED STATES PATENT OFFICE.

THOMAS HAYWOOD POYNTON, OF LEAMINGTON SPA, ENGLAND.

BODY FOR MOTOR VEHICLES.

Application filed December 24, 1927, Serial No. 242,506, and in Great Britain December 21, 1926.

This invention relates to collapsible hoods for road vehicles in which the support of the hood can be collapsed rearwards along suitable guides and folded upon a movable back portion which can be collapsed in rear of the vehicle.

According to my invention the roof portion consists of material of a flexible nature for instance treated fabric carried by transverse frame members connected to runners accommodated in elongated channel section guides which at their rear ends are curved downwards to enable the runners to be moved together adjacent the rear of the vehicle body, the runners preferably being metal or other suitable bodies having balls or rollers for engaging the base and overhanging upper sides of the guides, rollers being disposed at the sides of the said bodies for engaging the edges of said overhanging portions of the guides.

By the foregoing arrangement it is possible to provide an open top or totally enclosed body, the windows in the doors and sides being capable of sliding up and down opening or sidewise in the usual manner so that when the hood is drawn backwards an open body effect is obtained, or when drawn forward a saloon or closed body.

In order that the invention may be clearly understood and readily carried into effect a sheet of drawings is appended hereto, illustrating an embodiment of same, and wherein, Fig. 1 is a broken detail perspective view showing the arrangement of the runners, and guides.

Fig. 2 is an end view of a guide showing a runner in position, and

Fig. 3 is a perspective view showing somewhat diagrammatically the invention in use, the rear hood being shown collapsed and also in dotted lines extended.

Referring to the drawings the hood is composed of flexible material stretched over and secured to transverse frame members 2 engaged at their ends to metal blocks 3 forming the bodies of runner rollers or the like arranged to slide along a pair of channel section metal or wooden guides 4 which have overhanging upper edges 5.

The channel guides 4 extend horizontally from the front vertical frame member 6 of the vehicle body and curve downwards, as indicated at $4^a$, at their rear ends to the back of the body to enable the runners 3 to be moved close together. The leading frame member of the hood can be attached to the front screen frame members 6 in any of the well known manners, so that by disconnecting the hood from the frame members 6 it can be slid along the guides, the runners being brought close together to enable the hood to be folded.

The rear part $1^a$ of the hood consists of a structure which when opened out will engage the vertical frame members 7 of the rear door 8, this rear hood structure consisting of a number of frame members pivotally supported at the points 9, whereby the rear hood $1^a$ can be collapsed by swinging it rearwards after disconnecting the front frame member $9^a$ from the upper corners of the members 7.

The runners 3 each consists of a central block portion $a$ having lateral guides $b$ which carry on their upper sides ball runners $c$ which engage the overhanging parts 5. The base of the block $a$ also carries a ball runner $d$ thus enabling the runner 3 to follow the curve at the rear end of each guide 4. To obviate a jamb and to ensure an easy running action the corners of the block $a$ are preferably cut away to receive vertical axially rotatable rollers $e$ which contact with the edges of the overhanging portions 5 of the guide.

Each runner 3 has extending beyond its front and rear sides forks $f$ which pivotally support in one instance a rod like projection $g$, and in the other instance a sleeve like projection $h$, the rods $g$ sliding into the sleeves $h$, and the connection thus formed being flexible.

If desired the rear portion $4^a$, of the guides 4 can be struck from a radius emanating from the point 9 whereby the rear hood can also carry runners 3 travelling in the guides 4 the upper hood 1 if desired being integral with the rear hood. However, I have shown the rear hood $1^a$ as a separate structure which can be raised or lowered independent of or with the upper hood 1.

What I claim is:—

1. In a collapsible hood the combination of transverse frame members carrying a flexible covering, a pair of parallel box section guides each with a longitudinal slot in a horizontal side, blocks carried by the ends of the frame members and slidable in said slots, antifriction members carried by the blocks and running on the edges of said slots, a member attached to each block and all sliding inside said guides, said members carrying anti-friction members upon their upper and lower sides and engaging the inner surfaces of the upper and lower sides of the said guides, and interengaging tubular and rod like members connected to said blocks.

2. A collapsible hood comprising two parallel box section guides each with a slot along its upper face, a plurality of transverse rods carrying the flexible covering, runners carried by the ends of said rods and slidable in the said guides, each runner consisting of a horizontal plate extending across the inside of one of said guides, ball bearings carried by the upper and lower sides of said plates and engaging the inner surfaces of the horizontal sides of said guides, an upstanding central block portion carried by each plate and slidable in the said slots of the guides, rollers carried by the said blocks and engaging the edges of the said slots and interengaging tubular and rod like members pivotally connected to said runners.

THOMAS HAYWOOD POYNTON.